United States Patent [19]

Mouhot et al.

[11] Patent Number: 4,648,624
[45] Date of Patent: Mar. 10, 1987

[54] FIXING DEVICE FOR A TUBULAR PART, IN PARTICULAR FOR THE STEERING COLUMN OF A VEHICLE

[75] Inventors: Frédéric Mouhot, Voujeaucourt; Jean-Pierre Barnabe; André Hoblingre, both of Valentigney; Michel Clerc, Valentigney, all of France

[73] Assignee: Cycles Peugeot, Valentigney, France

[21] Appl. No.: 795,598

[22] Filed: Nov. 6, 1985

[30] Foreign Application Priority Data

Sep. 30, 1985 [FR] France ............................ 85 14471

[51] Int. Cl.[4] .............................................. B62D 1/18
[52] U.S. Cl. .................................... 280/775; 280/779; 74/493; 74/520; 269/228
[58] Field of Search ................ 74/554, 555, 556, 493, 74/503, 520, 495, 492; 280/775, 779; 269/228

[56] References Cited

U.S. PATENT DOCUMENTS

| | | | |
|---|---|---|---|
| 4,041,796 | 8/1977 | Shishido | 74/493 |
| 4,179,137 | 12/1979 | Burke | 280/775 |
| 4,240,305 | 12/1980 | Denaldi et al. | 74/493 |
| 4,244,237 | 1/1981 | Sprunger | 74/493 |
| 4,307,626 | 12/1981 | Sanada | 74/493 |
| 4,330,139 | 5/1982 | Katayama | 74/493 |
| 4,363,499 | 12/1982 | Watanabe et al. | 280/775 |

FOREIGN PATENT DOCUMENTS

| | | |
|---|---|---|
| 2360454 | 3/1978 | France . |
| 2491024 | 4/1982 | France . |
| 1523638 | 9/1978 | United Kingdom . |
| 2033855 | 5/1980 | United Kingdom . |
| 2116496 | 9/1983 | United Kingdom .................. 74/493 |

*Primary Examiner*—Lowell A. Larson
*Attorney, Agent, or Firm*—Sughrue, Mion, Zinn, Macpeak & Seas

[57] ABSTRACT

The tubular part (1) passes through a middle support piece (25) which is arranged between two clamping flanges (17a, 17b). A tie rod (21) passes through the flanges (17) and bears against the external surfaces of these flanges by means of a stop (29) and a clamping device on the one hand, and a nut (31), on the other hand. The clamping device consists of a bistable toggle-joint system comprising two levers (40,41) located in between the stop (29) and a bearing part (34). The stop (29), the levers (40,41) and the bearing part (34) have complementary hinging surfaces which are freely engaged with each other for assembly of the clamping device. With the device according to the invention it is possible to fix a steering column which can be continuously adjusted by pivoting and/or sliding. It is also possible to absorb the torques which may be transmitted to the steering column when the anti-theft device of the vehicle is engaged.

12 Claims, 22 Drawing Figures

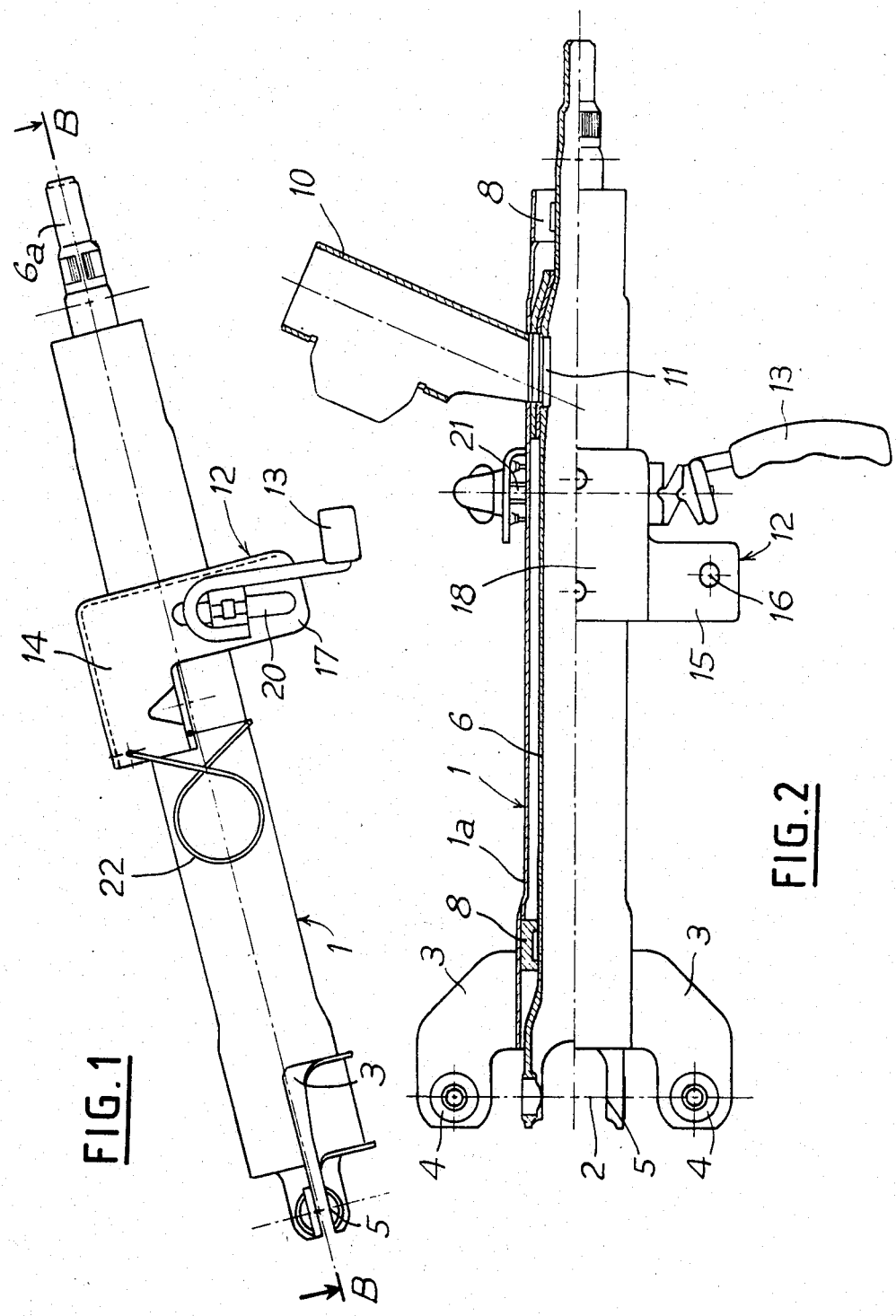

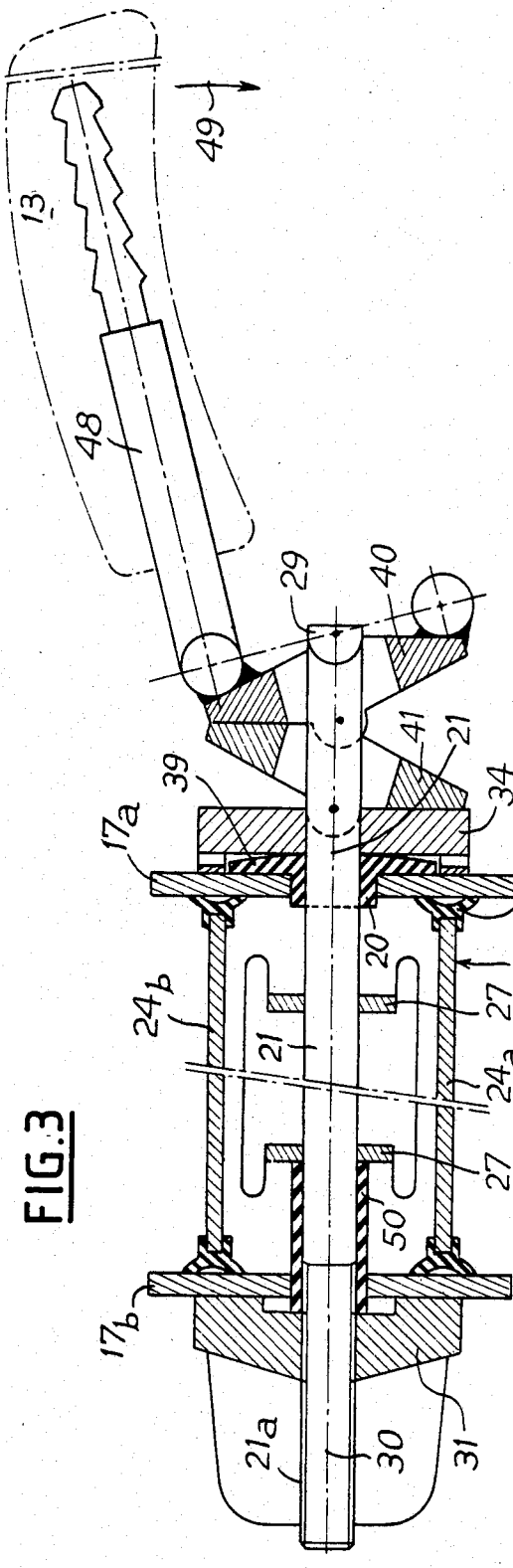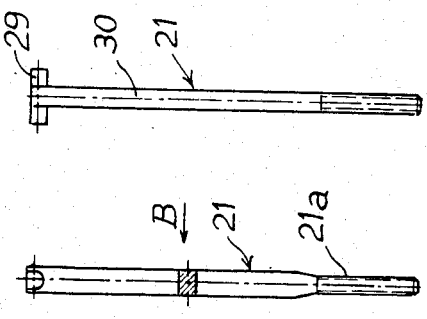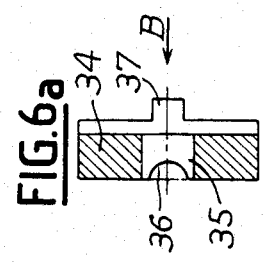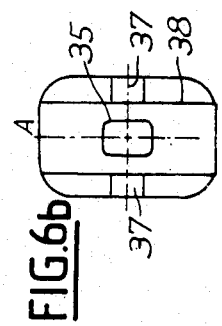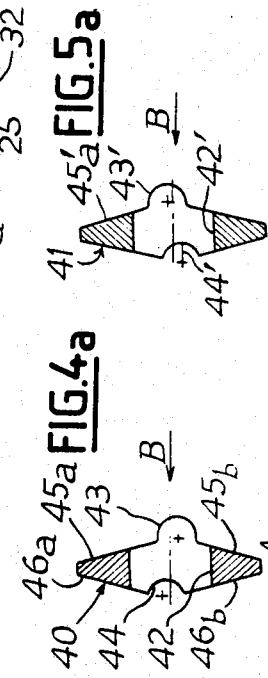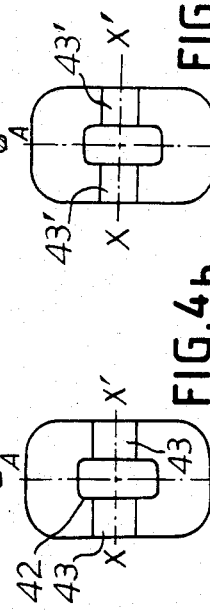

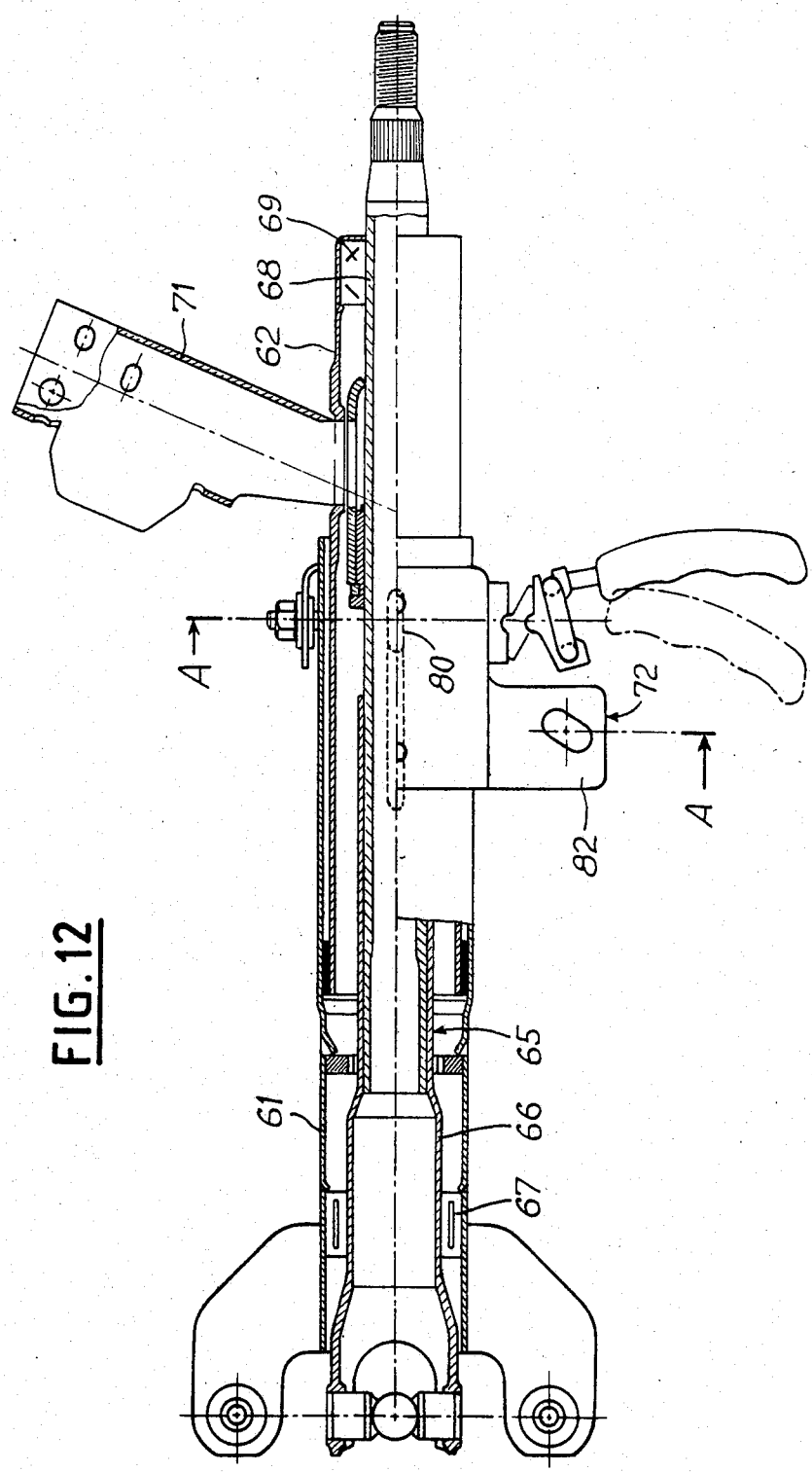

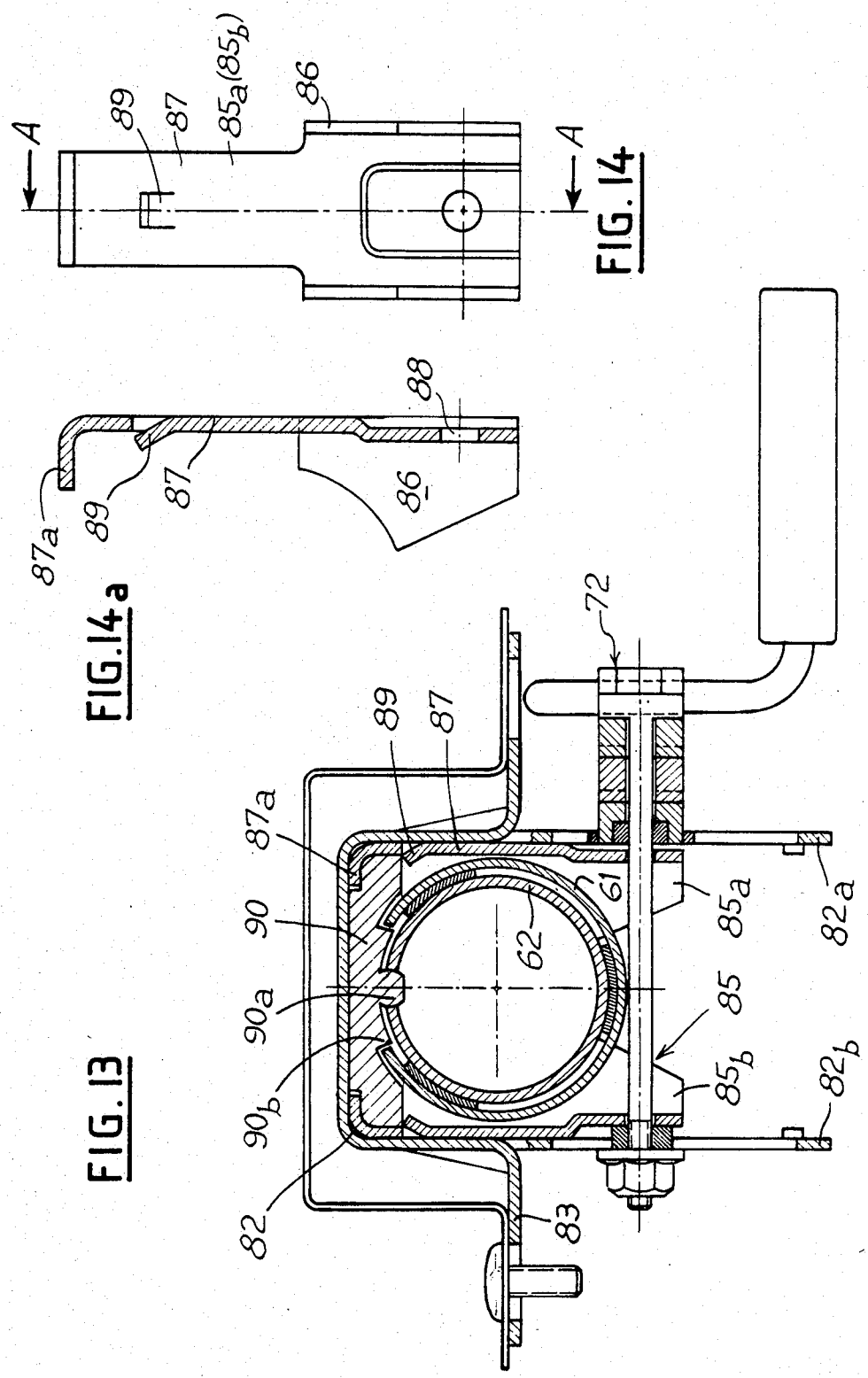

FIXING DEVICE FOR A TUBULAR PART, IN PARTICULAR FOR THE STEERING COLUMN OF A VEHICLE

The invention relates to a fixing device for a tubular part, in particular for a vehicle steering column which can be adjusted by means of pivoting and/or by means of axial displacement.

Motor-vehicle steering columns are known, the height of which can be adjusted by means of pivoting about a horizontal axis situated in the region where the upper part of the steering shaft is hinged. Steering columns are also known where adjustment is performed, in the axial direction, by means of relative telescopic displacement of some of their components.

These adjustable steering columns, which give rise to a greater degreee of comfort and increased safety during driving, must have means which are easily accessible and which can be easily operated by the driver so as to allow him to unlock the column, before it is adjusted, and to lock it into position when he/she has brought the column into its ideal position for driving.

Fixing devices for steering columns have already been proposed, which have a support piece which is fixed to a part of the vehicle bodywork in the vicinity of the steering wheel and consists of two substantially parallel lateral flanges which are joined to each other so as to form a U-shaped structure. This structure, which can be adjusted by moving the lateral flanges towards each other or away from each other, enables the steering column to be fixed by clamping, between these flanges, a middle part through which the column passes. This middle part is able to ensure both that the height of the steering column is fixed and that the latter is clamped so as to avoid relative axial displacement of its constituant parts. Clamping of the flanges, which is transmitted to the middle part, may be performed by means of a tie rod or a threaded rod which passes through the lateral flanges of the support piece in a transverse direction in relation to the column and which has stops at its ends situated outside and on either side of the flanges. One of these stops may consist, for example, of a nut mounted on the threaded rod and integral with a handle or of an operating button which enables the said nut to be turned so as to obtain a clamping or unclamping of the flanges. In such a device, however, the efficiency of fixing depends on the torque exerted by the driver on the handle or the button. The clamping force and therefore the fixing efficiency is essentially variable from one driver to another. Moreover, such devices may deteriorate as a result of jamming, oxidation or the formation of deposit on the threads.

Clamping devices have also been proposed, which consist of cams or eccentrics which are integral with an operating handle and bear, on the one hand, against one of the stops at the end of the tie rod and, on the other hand, against the external surface of the corresponding flange. Relative displacement of the stop and of the cam or eccentric thus exerts a tension on the tie rod which ensures clamping of the flanges. The cams or eccentrics used may have two limit points corresponding respectively to clamping or unclamping of the fixing device. Such devices, however, are subject to a certain degree of wear with time and must be adjusted fairly frequently in order to keep the clamping force exerted by the tie rod constant. In addition, it is difficult to determine precisely the clamping point and unclamping point, so that the fixing efficiency is not always completely independent of the force exerted by the driver on the operating handle.

Finally, the known fixing devices do not allow transmission to the body work, in a simple and effective manner, of the torques which may be transmitted to the column by the steering shaft when the latter are locked in rotation by the anti-theft device of the vehicle.

The object of the invention, therefore, is to propose a fixing device for a tubular part, in particular for a vehicle steering column which can be adjusted continuously by means of pivoting and/or telescopic axial displacement, comprising a support piece provided with means for fixing it rigidly to a fixed part such as the body of a vehicle and consisting of two substantially parallel lateral flanges joined to each other at one of their ends so as to form a U-shaped structure which can be adjusted by moving the flanges towards or away from each other, ensuring fixing of the tubular part by clamping a middle support piece through which the tubular part passes, by means of a tie rod passing through the lateral flanges in a transverse direction and provided with two bearing stops at its ends, situated outside and on either side of the lateral flanges and by means of at least one clamping device operated by a handle, bearing against one of the stops and against the external surface of the corresponding flange, so as to move the flanges towards each other in the transverse direction or, on the other hand, so as to allow them to be separated by means of elastic return, the fixing device, the efficiency of which is totally independent of the force exerted by the driver, which is practically foolproof and which possesses a very great resistance to wear and to other mechanical stresses during operation.

To this end, the clamping device is constructed in the form of a bistable toggle-joint device which has three hingeing axes parallel to each other and perpendicular to the axial direction of the tie rod and consists of two levers having a bore passing through their entire thickness and threaded with play onto the tie rod, in succession, between an end of this tie rod comprising a stop with a hinging surface and a part bearing against the lateral flange threaded onto the tie rod and comprising a hinging surface pointing in the opposite direction to the lateral flange, each of the levers comprising, on one of their faces which are transverse in relation to the axis of the tie rod, a hinging surface (male or female) and on their other transverse face another hinging surface (male or female) and each comprising, on their opposing faces, two flat bearing surfaces each intended to cooperate with a corresponding surface of the other lever, the first lever situated towards the outside being integral with the operating handle and being freely engaged via one of its hinging surfaces (male or female) with the hinging surface of the tie rod and via its other hinging surface with the corresponding hinging surface of the second lever, the second lever being freely engaged via one of its hinging surfaces (male or female) with the corresponding hinging surface of the first lever and via its other hinging surface with the hinging surface of the bearing part, the corresponding bearing surfaces of the levers being inclined and the axes of the hinging surfaces being arranged on the levers in such a way that, in a first bearing position of the levers or clamping position, the three hinging axes are substantially coplanar and, in a second bearing position of the levers or unclamped position, the middle hinging axis is clearly outside the plane defined by the two other axes, the movements from one position to another being obtained by tilting the first lever in either direction by means of the handle until the corresponding bearing surfaces come up against each other.

Preferably, the middle part by means of which the column or tubular part is clamped is designed by itself or in conjunction with keying means in such a way that the torques transmitted to the steering column are absorbed by the vehicle body in the most direct manner possible, using the support piece of the fixing device.

So that the invention is clearly understood, a description is now given by way of a non-limiting example, of several embodiments of a fixing device according to the invention, as applied to vehicle steering columns adjusted by means of pivoting and/or telescopic axial movements.

FIG. 1 is a side view of a steering column with height adjustment by means of pivoting.

FIG. 2 is a plan view of the steering column shown in FIG. 1 with an axial half-section along the line BB of FIG. 1.

FIG. 3 is a cross-sectional view of the device for fixing the steering column shown in FIGS. 1 and 2.

FIG. 4a is a cross-sectional view of the first lever of the clamping device shown in FIG. 3.

FIG. 4b is a view in the direction of the arrow B shown in FIG. 4a.

FIG. 5a is a cross-sectional view of the second lever of the clamping device shown in FIG. 3.

FIG. 5b is a view in the direction of the arrow B shown in FIG. 5a.

FIG. 6a is a cross-sectional view of the bearing part of the clamping device shown in FIG. 3.

FIG. 6b is a view in the direction of the arrow B shown in FIG. 6a.

FIG. 7a is a plan view of the tie rod of the clamping device shown in FIG. 3.

FIG. 7b is a view in the direction of the arrow B of the tie rod shown, in FIG. 7a.

FIG. 12 is a view, in partial axial cross-section, of a steering column which can be adjusted by means of pivoting and telescopic axial displacement and which is provided with a fixing device according to the invention and according to a variation.

FIG. 13 is a sectional view along the line AA shown in FIG. 12.

FIG. 14 is a side view of one of the two guiding plates forming the middle support piece of the steering column shown in FIGS. 12 and 13.

FIG. 14a is a sectional view along the line AA shown in FIG. 14.

Figure 8C:
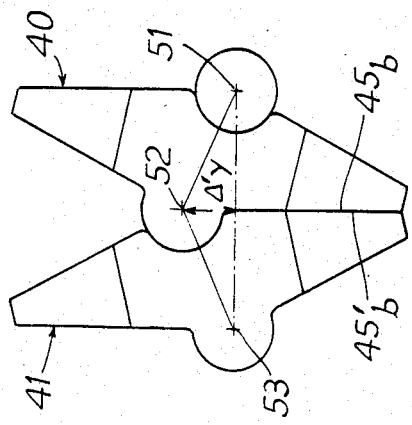
FIGS. 8a, 8b and 8c, are schematic illustrations, on an enlarged scale, of the parts forming the clamping device, in different relative positions showing the operation of this bistable toggle-joint system.

FIGS. 1 and 2 show a steering column 1, the height of which can be adjusted by means of pivoting about a horizontal axis 2 passing through the axes of the two points where the column 1 is attached to the body of the vehicle. The external tube 1a of the column 1 is integral, at the bottom, with two fixing lugs 3 with holes which allow the column to be fixed to the body by means of screws passing through the central bore of two elastic spacers 4 made of elastomer. This flexible fixing arrangement allows the column 1 to be pivoted slightly so that it can be adjusted about the axis 2. This axis 2 merges with the axis of the universal joint 5 connecting the upper part 6 of the steering shaft to the middle part of this shaft (not shown). The height of the steering column 1 can therefore be adjusted by means of pivoting about an axis merging with the coupling axis of the steering shaft 6 which is mounted rotatably inside the tube 1a of the column 1 by means of rolling bearings 8.

In FIG. 1, the steering column 1 has been shown in the inclined position which it occupies inside the vehicle, it being possible for the driver to adjust this inclination within certain limits, as will be described below. The steering wheel (not shown) is integral with the upper part 6a of the steering shaft.

As can be seen in FIG. 2, the steering column 1 has mounted on it an anti-theft housing 10 intended to receive a lock in an opening 11 provided in the upper part of this steering shaft 6, it being possible to engage the bolt of the said lock so as to lock the steering shaft in position.

The column 1 is engaged inside the fixing device according to the invention, indicated generally by the reference number 12. As a result of this device, it is possible to unlock the column so as to adjust its inclination, and then lock this column after adjustment has been performed, by means of an operating handle 13 which is easily accessible from the driver's seat.

The device 12 has a support piece 14 provided with two lugs, such as 15, which enable the support piece 14 to be fixed to the body of the vehicle by means of screws engaged in holes 16 passing through the lugs 15. The support piece 14, only half of which can be seen in FIGS. 1 and 2, is made so as to have an entirely symmetrical shape in relation to the axial plane of symmetry of the steering column, by folding a steel sheet. This support piece has two lateral flanges 17 and a joining part 18, between the lateral flanges 17, forming with these flanges a structure with a cross-section in the form of a U between the arms of which the column 1 is engaged.

Each of the flanges 17, which are located vertically when the support piece 14 is in position on the body of the vehicle, has a guiding aperture 20 limited by two arcs of a circle having a common center on the axis 2. The guiding apertures in the flanges 17 are mutually symmetrical in relation to the axial and vertical plane of symmetry of the column. A tie rod 21 with a square or rectangular cross-section is engaged with play inside the apertures 20, at each of its ends, and thus allows the middle part supporting the column 1, described below, to be guided during pivoting of the column.

The support piece 14 also has a spring 22 which ensures that the column 1 is supported so as to prevent it falling down when the device 12 is unlocked. This spring 22 is engaged, via its ends, in the side parts of the support piece 14 and supports the column 1 by means its middle part.

Reference will now be made to FIG. 3 as well as to FIGS. 4 to 7 so as to describe in more detail the fixing device according to the invention, indicated generally by the reference number 12 and associated with the steering column shown in FIGS. 1 and 2.

FIG. 3 shows a section through the entire device along a plan of symmetry passing through the axis of the tie rod 21 with a square cross-section, which is engaged with the vertical flanges 17a and 17b which form the lateral parts arranged in accordance with the arms of the U forming the cross-section of the support piece 14.

Figure 9:
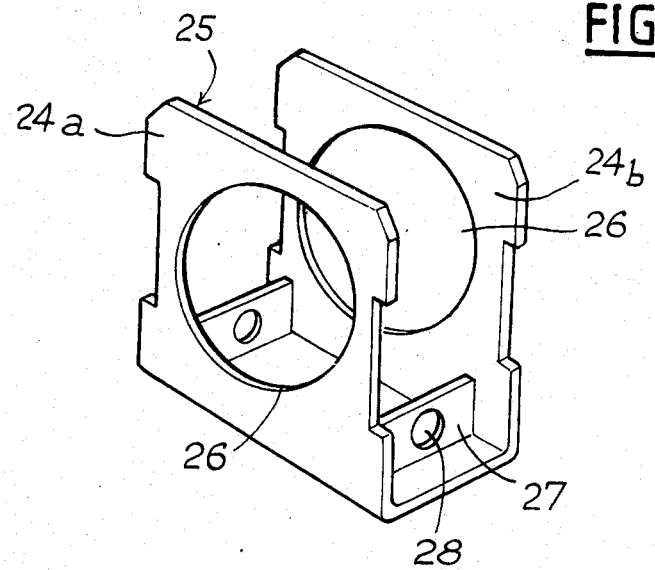
FIG. 9 is a perspective view of the middle support part of the steering-column shown in FIGS. 1 and 2.

The external tube 1a of the column 1 is integral with a middle support part 25 shown in FIG. 9. This part, which is made of folded steel, has two opposite and parallel flanges 24a and 24b with circular openings 26 which permit the passage of the external tube 1a of the steering column 1 which is fixed by means of welding to the flanges 24a and 24b along the contour of the openings 26. The middle support piece 25 also has two lugs 27 obtained by means of folding and directed perpendicularly in relation to the flanges 24a and 24b, each having an opening 28 allowing the tie rod 21 to pass through.

As can be seen in FIG. 3 and FIGS. 7a and 7b, the the rod 21 has at one of its ends a stop 29 forming a male, semi-cylindrical, hinging surface, the axis of which is perpendicular to the longitudinal axis 30 of the tie rod 21 and coincides with this axis. The other end 21a of the tie rod 21 is threaded and a self-locking tightening nut 31 is mounted on this threaded end so as to come up against the external face of the flange 17b of the support piece 14. The middle support piece 25 of the column 1 is engaged between the flanges 17a and 17b, with the insertion, between the edges of the flanges 24 and the flanges 17, of four sliding shoes 32. The column 1 is fixed integrally with the middle support piece 25 by clamping the flanges 24a and 24b between the flanges 17a and 17b, exerting a longitudinal pulling force on the tie rod 21 by means of a clamping device located between the stop 29 and a bearing part 34 in contact with the external face of the flange 17a of the support piece 14. The bearing part 34, as can be seen in FIGS. 3, 6a and 6b, has a central opening 35 with a rectangular or square shape, which passes through it from one side to the other and allows the tie rod 21 of rectangular or square cross-section to pass through it, as well as a female, cylindrical, hinging surface 36 consisting of two parts, the axis of which coincides with the axis of the opening 35 corresponding to the axis 30 of the tie rod 21. The part 34 also has two guiding shoulders 37 situated on either side of a groove 38 permitting the arrangement, inside the latter, of an elastic part 39 inserted inside the aperture 20 of the flange 17a and in contact with the external face of this flange.

The actual clamping device consists of two levers 40 and 41 which can be seen in FIGS. 4a, 4b and 5a, 5b, respectively.

The lever 40 has a central opening 42, which is rectangular in shape and the width of which is very slightly greater than the cross-sectional side of the tie rod 21 and the length of which allows this lever 40 clearance when it is engaged onto the tie rod 21. The lever 40 also has a cylindrical, male, hinging surface 43 and a cylindrical, female, hinging surface 44 situated on two opposite sides of the lever 40 and having axes positioned on either side of the plane of symmetry of the lever indicated by the line XX' in FIG. 4b. The lever 40 has, in addition, two inclined and flat bearing surfaces 45a and 45b on one of its sides and two other inclined surfaces 46a and 46b on its other side.

The lever 41 has an opening 42', hinging surfaces 43' and 44' as well as inclined surfaces 45'a, 45'b, 46'a and 46'b equivalent to the opening and to the hinging and bearing surfaces which were described for the lever 40. However, the arrangement of the axes of the hinging surfaces 43' and 44' is reversed compared with the arrangement of the axes of the hinging surfaces 43 and 44, in relation to the plane of symmetry indicated by the line XX'.

Assembly of the levers 40 and 41 between the stop 29 and the bearing part 34 can be seen in FIG. 3 where the levers have been shown in the clamping position; a pulling force is thus applied to the tie rod 21 by means of the levers, between the stop 29 and the nut 31. Elastic deformation of the flanges enables a clamping force to be exerted between the flanges 17a and 17b by means of the levers and the bearing part 34.

The transition from the clamping position to the unclamping position is obtained by pivoting the lever 48 integral with the handle 13 and welded to the actuating lever 40 in the direction of the arrow 49.

The device is assembled by simply engaging the corresponding male and female cylindrical hinging surfaces with each other, tightening of the nut 31 ensuring that the different parts of the clamping device fit together. With this nut 31, it is also possible to adjust to a given value the pulling force exerted on the tie rod 21 during clamping. A tubular elastic part 50, which is made of elastomer and inserted between the nut and one of the lugs 27 of the middle support piece 25, gives rise, in conjunction with the elastic part 39, to additional flexibility of the device during locking and to a more decisive unlocking action, these parts acting as a return spring.

Figure 8B:
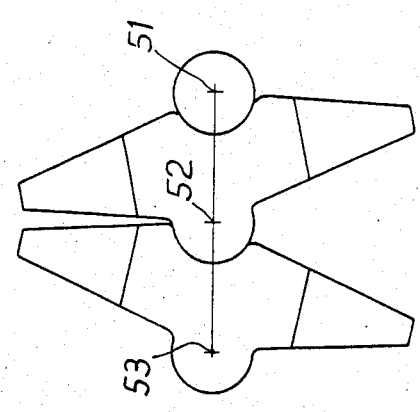
Figure 8A:
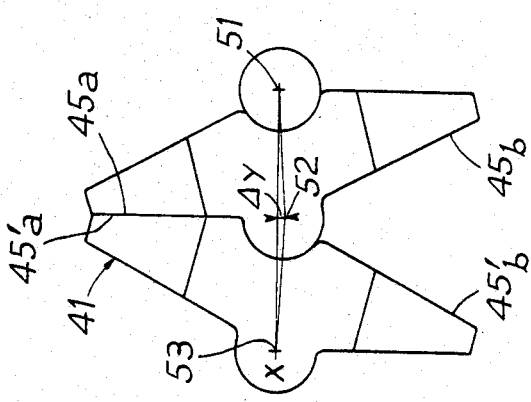

FIGS. 8a, 8b and 8c show the relative position of the axes 51, 52 and 53 of the three hinging arrangements formed by the assembly of the clamping device components, during three different stages of the clamping or unclamping operations.

FIG. 8a corresponds to the stable clamping position of the device, FIG. 8b corresponds to the transition to the maximum clamping position which constitutes a "hard point" during the operation, and FIG. 8c corresponds to the stable unclamping position of the device. It can be seen that the clamping device according to the invention operates in the manner of a toggle-joint arrangement, the three parallel hinging axes of which pass from a clamping position where they are practically coplanar, the distance between the end axes 51 and 53 being maximal in this case, to an unclamping position where the middle axis 52 is situated clearly outside the plane defined by the end axes 51 and 53.

The corresponding bearing surfaces of the external lever 40 and of the internal lever 41 situated on their sides facing each other are able, owing to an angle of inclination defined in relation to the plane containing the hinging axes, to ensure that the levers 40 and 41 come up against each other at the end of the clamping movement, in such a way that the axis 52 is thus situated below the plane defined by the axes 51 and 53 and at a very small distance $\Delta Y$ of this plane. In the same way, the bearing surfaces 45b and 45'b of the levers 40 and 41, respectively, are such that, at the end of unclamping, the axis 52 is clearly located above the plane defined by the axes 51, 53. The distance $\Delta'Y$ between the axis 52 and the plane defined by the axes 51 and 53 is thus far greater than the distance $\Delta Y$. Between these two end-of-travel positions, the device passes through the maximum clamping position or "hard point" shown in FIG. 8b. In this case the axis 52 is located exactly in the plane defined by the axes 51 and 53. This transition through the "hard point" makes it possible to introduce a clicking action into the operation of the device during clamping. Clamping depends only on the tension of the tie rod 21 which, itself, is always identical in the position of the levers 40 and 41 corresponding to clamping. These levers are automatically brought into their end clamping position by operation of the handle 13 and lever 48 requiring an actuating force which is always the same and which is chosen within limits 5. which allow the device to be operated without difficulty.

The clamping force is transmitted to the flanges 17a and 17b by the bearing part 34 and the nut 31, thereby causing the flanges 17a and 17b to move towards each other as a result of elastic deformation of the support piece 14. The flanges 24a and 24b of the middle support piece 25 are therefore clamped between the flanges 17a and 17b; fixing of the column 1 is thus ensured. The shoes 32 are deformed elastically during clamping and make it possible to achieve a smooth sliding action for the movements of the column.

During unclamping, the flanges 17a and 17b return to their normal distance apart owing to the elasticity of the housing 14 and to the shoes 32, and the support piece 25 is freed, which enables the column to be moved by means of pivoting about the axis 2, this movement being guided by the displacement of the tie rod 21 inside the apertures 20 of the housing 14. When a new adjustment position has been chosen, clamping of the middle support piece 25 is performed again by operating the handle 13. During unclamping, release of the middle support piece 25 is facilitated by the elastic devices 39 and 50 and the shoes 32.

It will be noticed that, as a result of assembly of the middle support piece 25 inside the fixed support piece 14, it is possible to absorb directly the torques exerted on the steering column 1, in the region of the support piece 14 fixed to the body. In fact, the tube 1a of the column is integral with the housing 25 which is retained between the flanges 17 of the housing 14. When the bolt of the anti-theft housing 10 is engaged in the opening 11 of the steering shaft 6 and in the opening located opposite the external tube 1a, the shaft and the column tube are thus locked in rotation about the steering shaft. If a considerable force is then exerted on the steering wheel, for example in the event of somebody breaking into the vehicle, the torque is thus transmitted directly to the support piece 14 which is located in the vicinity of the anti-theft housing 10, along the length of the steering column 1. The forces are therefore transmitted to the body in such a way that the external tube 1a of the steering column is not subjected to any strain which may lead to it being damaged.

Figure 10:
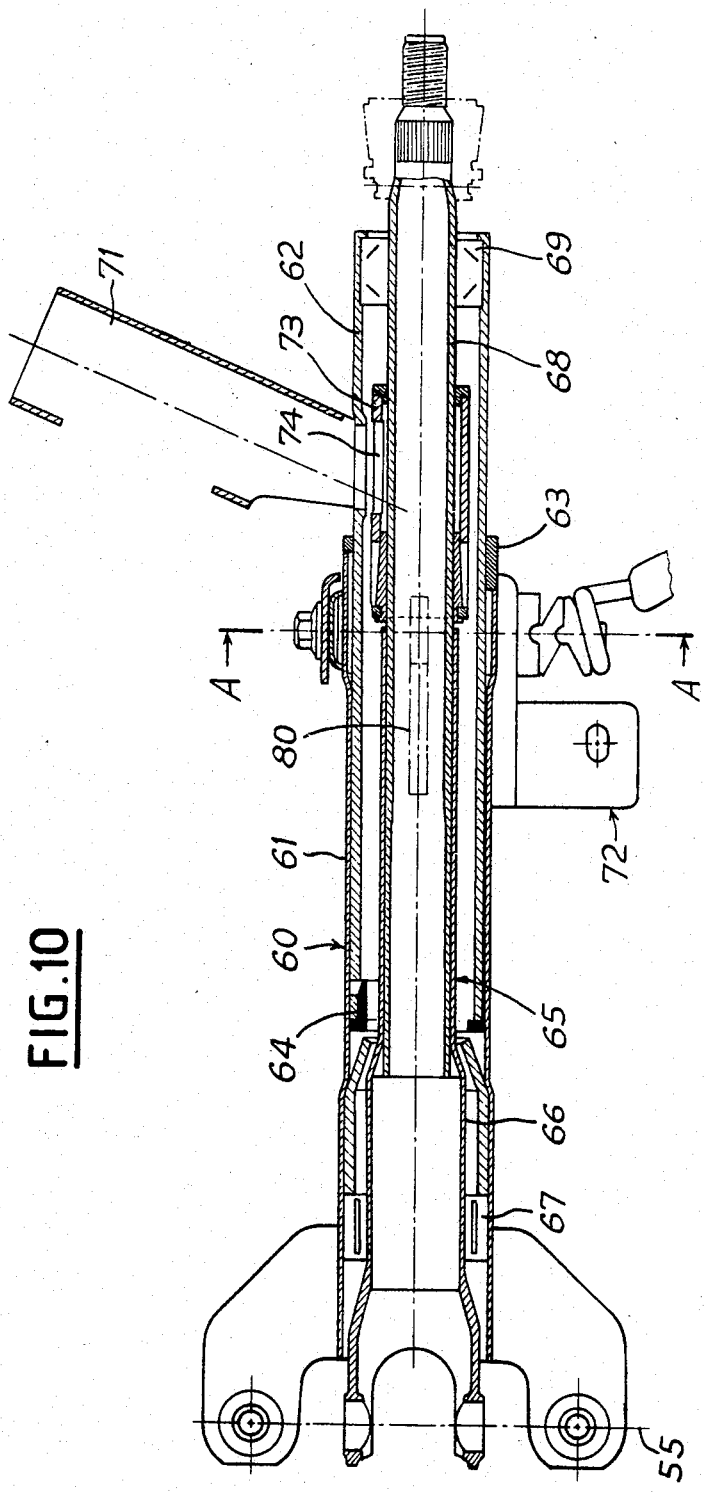
FIG. 10 is a view, in axial section, of a steering column which can be adjusted by means of pivoting and telescopic axial displacement and which is provided with a fixing device according to the invention.

FIG. 10 shows a steering column 60 assembled in such a way that adjustment can be performed both by means of pivoting about an axis 55 coinciding with the hinging axis of the steering shaft, as was described above with reference to FIGS. 1 and 2, and by means of telescopic displacement, as will be described below. The external tube of the column 60 consists of a column casing 61 and of an adjustment tube 62 mounted in telescopic fashion by means of ringed joints 63 and 64 inside the column casing 61.

In the same way, the steering shaft 65 is mounted in telescopic fashion and has a bottom part 66 mounted rotatably by means of a rolling bearing 67 inside the column casing 61 and a top part 68 mounted in sliding fashion in the axial direction inside the bottom part 66 and mounted so as to be freely rotatable and rigid in translation with the sliding tube 62 inside this tube, by means of a bearing 69. The two telescopic parts 66 and 68 of the steering shaft are mounted so as to be locked in rotation about the steering shaft owing to the corresponding splines machined in their internal and external surfaces respectively.

The sliding part 62 of the external tube of the steering column carries the anti-theft housing 71 and the top part 68 of the steering shaft has mounted on it a locking sleeve 73 with an opening 74 passing through it, into which the bolt of the anti-theft locking device can be engaged.

Fixing of the steering column after adjustment by means of pivoting or telescopic displacement or by means of a combination of these two movements may be ensured by means of a fixed device 72 according to the invention, which is practically identical to the device described above, apart from the structure and the functions of the middle part supporting the steering column.

Figure 11A:
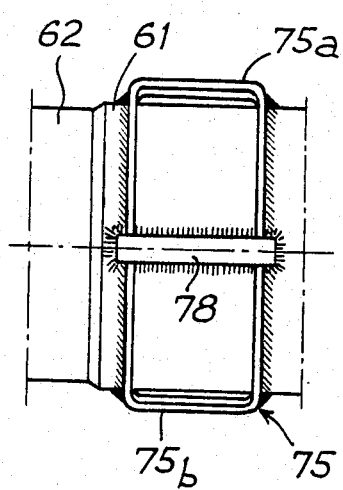
FIG. 11a is a view in the direction of the arrow A shown in FIG. 11.
Figure 11:
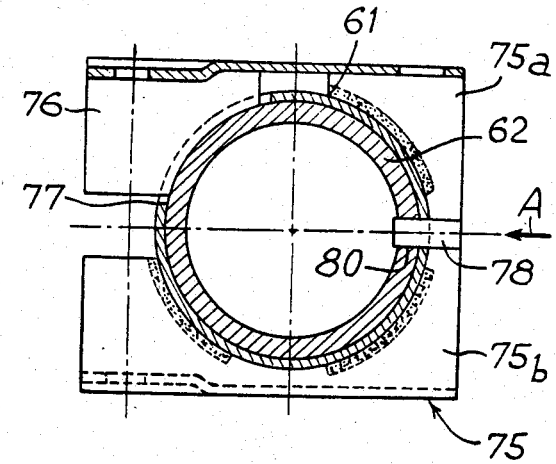
FIG. 11 is a sectional view, along the line AA shown in FIG. 10, of the middle support piece of the steering column.

This middle support piece 75 is shown in FIGS. 11 and 11a. It has two practically symmetrical elements 75a and 75b which are made of folded sheet metal and are cut so as to leave an internal passage corresponding to the column casing 61. The element 75b is welded to the column casing 61 over practically the entire length of the semicircular opening through which the column casing passes.

The part 75a of the support piece 75 is welded to the column casing 61 over a distance corresponding approximately to half of the semicircular opening through which this column casing 61 is able to pass. The left-hand part 76 of this element 75a has not been welded to the column casing 61 and forms a clamping jaw passing through a set of openings 77 passing through the column casing 61. The middle support piece 75 is mounted inside the fixed support piece of the device 72 in the same manner as the support piece 25 in the embodiment described above. This middle support piece 75 is therefore subjected to a clamping pressure which tends to move its two parts 75a and 75b towards each other. However, only the part 76 of the support piece 75 is able to move by means of elastic deformation of its part joined to the remainder of the element 75a. The jaw 76 is thus able to penetrate the opening 77 of the column casing 61 so as to clamp the sliding tube 62. Thus, it is possible to achieve both fixing of the column casing 61 inside the fixed support piece of the device 72 by clamping the support piece 75 inside this fixed support piece as well as fixing of the sliding tube 62 in relation to the support piece 75 and the column casing 61.

A key 78 which is welded to the column casing 61 is fixed between the two elements 75a and 75b of the middle support piece 75. This key 78 projects towards the inside of the column casing 61 and penetrates an aperture 80 passing through the wall of the sliding tube 62 and pointing along a generatrix of this tube 62.

The primary function of the key 78 is to guide and hold the tube 62 during its telescopic movements inside the column casing 61. When the bolt of the anti-theft device 71 is engaged in the corresponding openings of the tube 62 and of the steering shaft, the key 78 also serves to transmit a torque which might be exerted on the steering shaft 65, directly to the fixed support piece of the device 72 and hence to the vehicle body.

The embodiment of the fixing device applied to the steering column, as shown in FIGS. 10 and 11, therefore makes it possible to achieve, by means of a simple and rapid operation, both fixing of the column casing in relation to the bodywork and fixing of the telescopic parts in relation to the column casing. The device also serves to transmit directly to the body, the torques which could be exerted on the steering column when the anti-theft device is locked.

FIG. 12 shows, in a view similar to that of FIG. 10, an embodiment of a steering column which can be adjusted by means of pivoting and telescopic axial displacement, comprising components similar to those of the column shown in FIG. 10. These corresponding components have the same reference numbers in both figures.

The differences between the two embodiments relate essentially to the design of the middle support piece for clamping the column, the way in which it is assembled inside the fixed piece 82 of the fixing device 72 and the new possibilities as regards the design of the column casing 61.

In FIGS. 12 and 13 it can be seen that the fixing device 72 is practically indentical to the device described above. This device, during its clamping movement, allows the flanges 82a and 82b of the fixed support piece 82 to be moved towards each other by means of elastic deformation of the said fixed support piece. These flanges 82a and 82b bear against two guiding plates 85a and 85b which form the middle support piece 85. Clamping, which enables the steering column to be fixed, is transmitted, as before, by means of this support piece 85.

FIGS. 14 and 14a show one of the guiding plates 85a or 85b forming one of the two parts of the support piece 85. This guiding plate consists of folded sheet metal and has two lower flanges 86 which are cut away so as to form part of a circle, the radius of which corresponds to the radius of the sliding tube 62 of the steering column shown in FIG. 12. The two flanges 86 are joined by means of a plate 87 with an opening 88 in its lower part so as to allow the tie rod of the clamping device to pass through. The plate 87 also has a tab 89 bent inwards and an upper folded edge 87a.

FIG. 13 shows the arrangement of the two separate parts 85a and 85b of the middle support piece 85, inside the fixed support piece 82. The parts of the flanges 86 which are cut away so as to form part of a circle pass through the column casing 61 via openings provided in this column casing. A key 90 is engaged between the two plates 85a and 85b against the folded shoulder 87a and held in position by the tab 89 which is bent inwards. The column casing 61 has a cut away part in the region of the key 90 which allows the keying projection 90a to penetrate into the sliding tube 62 and allows the column casing 61 to engage with the cut-away parts 90b in the key 90. The keying projection 90a penetrates inside a corresponding groove 80 machined in the sliding tube 62. The sliding tube is thus guided and held during its axial movements and the torques which might be transmitted to the sliding shaft 62 by the steering shaft 65, when the anti-theft device is locked, are directly absorbed by the support piece 82 which is fixed to the bodywork by means of screws passing through fixing lugs 83.

In this embodiment the middle support piece 85 is not fixed by means of welding to the column support piece 61, and this column support piece is not subjected to any torgue originating from the steering shaft, by means of the sliding shaft 62. It is therefore possible to use a column support piece which has a particularly light design since this column casing is not subjected to any significant stresses. Moreover, since there is no metallurgical connection between the column casing and the intermediate support piece, this column casing may be made of a material other than metal and, for example, may be made of plastic.

It is quite clear that the invention is not limited to the embodiments which have been described.

Thus, the shape and the assembly of the parts which make up the clamping device may be different and, in particular, the male and female hinging surfaces may be in a reverse order with respect to the description given above. It is also quite obvious that the device according to the invention may be used not only for steering columns which are adjusted by means of pivoting or for steering columns which are adjusted both by means of pivoting and by means of telescopic displacement, but also in the case of columns where adjustment is performed solely by means of telescopic axial displacement.

Finally, the fixing device according to the invention is used for fixing tubular parts other than steering columns, for example for fixing the adjustable devices of measuring equipment or for assembling structures which can easily be disassembled.

We claim:

1. Fixing device for a tubular part such as a vehicle steering column (1) which can be adjusted continuously by means of pivoting and/or telescopic axial displacement, comprising a support piece (14) provided with means (15, 16) for fixing it rigidly to a fixed part such as the body of a vehicle and consisting of two substantially parallel lateral flanges (17) joined to each other at one of their ends so as to form a U-shaped structure which can be adjusted so as to move the flanges (17) towards or away from each other, ensuring fixing of the tubular part (1) by clamping a middle support piece (25) through which the tubular part (1) passes by means of a tie rod (21) passing through the lateral flanges (17) and the support piece (25) in a transverse direction and provided with two bearing stops (29, 31) at its ends situated outside and on either side of the lateral flanges (17), and by means of at least one clamping device opeated by a handle (13) bearing against one of the stops (29) and against the external face of the corresponding flange (17) so as to move the flanges (17a, 17b) towards each other in the transverse direction or, on the other hand, so as to allow them to be separated by means of elastic return, the tie rod (21) passing through the flanges (17) by way of elongated apertures (20) to permit pivoting of the tubular part (1) and/or the tubular part having two parts telescopically mounted for sliding in the axial direction, wherein the clamping device is constructed in the form of a bistable toggle-joint device which has three hinging axes (51, 52, 53) parallel to each other and perpendicular to the axial direction of the tie rod (21) and consists of two levers (40, 41) having hole passing through their entire thickness and engaged with play onto the tie rod (21), in succession, between one end of this rod comprising the stop (29) with a hinging surface and a part (34) bearing against the lateral flange (17a), which part is engaged onto the tie rod (21) and has a hinging surface pointing in the opposite direction to the lateral flange (17a), each of the levers (40, 41) comprising, on one of their faces which are transverse in relation to the axis of the tie rod (21), a hinging surface (male and female) (44, 44') and, on their other transverse face, another hinging surface (male or female) (43, 43') and each comprising, on their opposing faces two flat bearing surfaces (45a, 45b and 45'a, 45'b) each intended to cooperate with a corresponding surface of the other lever.

the first lever, situated towards the outside, being integral with the operating handle and being freely engaged via one of its hinging surfaces (male or female) (43, 44) with the hinging surface (29) of the tie rod (21) and via its other hinging surface (43, 44) with the corresponding hinging surface (43', 44') of the second lever (41).

the second lever (41) being freely engaged via one of its hinging surfaces (male or female) (43', 44') with the corresponding hinging surface (43, 44) of the first lever (40) and via its other hinging surface (43', 44") with the hinging surface (36) of the bearing part (34).

the coresponding bearing surfaces (45a, 45'a and 45b, 45'b) of the levers (40, 41) being inclined and the axes of the hinging surfaces being arranged on the levers (40, 41) in such a way that, in a first bearing position of the levers (40, 41) or clamping arrangement, the three hinging axes (51, 52, 53) are substantially coplanar and that in a second bearing position of the levers (40, 41) or unclamped position, the middle hinging axis (52) is clearly outside the plane defined by the two other axes (51, 53) the movements from one position to another being obtained by tilting the first lever (40) in either direction, by means of the handle (13), until the corresponding bearing surfaces (45a, 45'a or 45b, 45'b) come up against each other.

2. Fixing device as claimed in claim 1, wherein the middle support piece (25) of the tubular part (1) consists of two parallel flanges (24a, 24b) having openings (26) passing through them, in which the tubular part (1), which is fixed rigidly to the flanges (24a, 24b) of the middle support piece, is engaged, the tubular part (1) and the middle support piece being engaged between the flanges (17a, 17b) of the fixed support piece (14) in such a way that the flanges (24a, 24b) of the middle support piece are substantially perpendicular to the flanges (17a, 17b) of the fixed support piece (14) and so that clamping of the middle support piece (25) inside the flanges (17) of the fixed support piece (14) is performed on the opposite sides of the flanges (24a, 24b) of the middle support piece (25).

3. Fixing device as claimed in claim 2, wherein clamping between the flanges (17a, 17b) of the fixed support piece (14) and the flanges (24a, 24b) of the middle support piece (25) takes place via flexible shoes (32).

4. Fixing device as claimed in claim 2, wherein the middle support piece (25) has lugs (27) with openings through which the tie rod (21) passes.

5. Fixing device as claimed in any one of claims 1 and 2, wherein the stop of the tie rod (21), opposite the clamping device, consists of a self-locking nut (31) engaged on a threaded part (21a) of the tie rod (21) and enabling the tension of the tie rod (21) to be adjusted.

6. Fixing devices claimed in claim 5, wherein an elastic part (50) surrounding the tie rod (21) is inserted between the nut (31) and the middle support piece (25) of the tubular part (1) so as to facilitate unclamping.

7. Fixing device as claimed in claim I, wherein an elastic part (39) is inserted between the bearing part (34) and the corresponding flange (17a) of the fixed support piece (14).

8. Fixing device as claimed in any one of claims 1 and 2, in the case where the tubular part is a vehicle steering column which can be adjusted continuously by means of pivoting about a horizontal axis, wherein the tie rod (21) passes through the flanges (17a, 17b) of the support piece (14) fixed to the body of the vehicle via apertures (20) limited by the arcs of a circle centered on the pivoting axis (2) of the steering column.

9. Fixing device as claimed in claim 1, in the case where the tubular part is a steering column (60) which can be adjusted by means of pivoting and telescopic displacement of a sliding shaft (62) inside a column casing (61), wherein the middle support piece (75) of the column (60) has an opening for receiving the column casing (61) to which it is fixed by means of welding over at least part of the arc length of the opening and at least one part (76) forming a clamping jaw which is not fixed to the column casing (61) and is situated in the region of an opening (77) in the column casing (61) which allows the clamping jaws to pass through it so as to clamp the sliding tube (62) by means of elastic deformation of the middle support piece (75) under the clamping action of the flanges of the fixed support piece.

10. Fixing device as claimed in claim 9, wherein a key (78) is fixed by means of welding to the column casing (61), transversely in relation to this column casing, and comprises a part which points towards the inside of the column casing (61) and is engaged in an opening (80) of the sliding tube (62) so as to guide this tube (62) and transmit the torque between the sliding tube (62) and the fixed support piece.

11. Fixing device as claimed in claim 1, in the case where the tubular part is a vehicle steering column which can be adjusted by means of pivoting and telescopic displacement of a sliding tube (62) inside a column casing (61), wherein the middle support piece (85) consists of two separate bearing plates (85a, 85b) each comprising a bearing surface corresponding to the external cylindrical surface of the sliding tube (62), positioned opposite a corresponding cut-out in the column casing (61), so as to form clamping jaws coming into contact with the sliding tube (62) when the clamping device (72) is operated.

12. Fixing device as claimed in claim 11, wherein a key (90) located between the two parts (85a and 85b) of the middle support piece (85) has a keying projection (90a) passing freely through an opening in the column casing (61) and engaged in a slot (80) passing through the wall of the sliding tube (62), so as to guide the sliding tube (62) axially and directly absorb the torque between the sliding tube (62) and the body of the vehicle, by means of the fixed support piece (82).

* * * * *